United States Patent [19]
Gorny

[11] 3,873,754
[45] Mar. 25, 1975

[54] FOAMED SUGAR PRODUCTS

[76] Inventor: Dietrich Gorny, Auf dem Muhlberg 33, 6 Frankfurt, Germany

[22] Filed: Dec. 4, 1972

[21] Appl. No.: 312,185

[30] Foreign Application Priority Data
Apr. 28, 1972 Germany............................ 2221067

[52] U.S. Cl................ 426/426, 426/442, 426/470
[51] Int. Cl............................................. A23b 5/02
[58] Field of Search .......... 426/426, 442, 470, 385, 426/163

[56] References Cited
UNITED STATES PATENTS
2,200,963  5/1940  Mink................................. 426/470
3,031,312  4/1962  Margau et al....................... 426/470

*Primary Examiner*—Samih N. Zaharna
*Assistant Examiner*—J. M. Hunter

[57] ABSTRACT

In the preparations of sweetmeat products with a foamed or cellular structure from albumen and sugar, the foamed product is hardened by treatment with alcohol. This confers an increased shelf-life on the product and avoids the spoilage which occurs when the hardness is produced by heating at an elevated temperature.

3 Claims, No Drawings

FOAMED SUGAR PRODUCTS

Foamed sugar products are made from sugar and foam-forming substances, such for example, as egg albumen, albumen substitute or gelatine, sometimes with taste-giving colouring and character influencing substances. As regards the character there is a differentiation between soft and hard foamed sugar products. The basic difference between the production of hard foamed sugar products and soft sugar products lies in the fact that during the making of the hard products the latter are subjected to drying under heat conditions. A major drawback suffered by the soft foamed product is that without stabilizing additives they have deficient keeping qualities. After only a few days the foam structure collapses and the products lose this characteristic. Hard foamed sugar products are much more stable but since they are dried under heat conditions they exhibit certain defects. The drying process can frequently lead to undesirable Maillard reactions which give the product a brownish appearance. Again the vitamins present in the products are destroyed by the heating and the albumen is denatured to an unfortunate extent. Another serious drawback is that a brittle structure is imparted to the products during this heat drying procedure.

It is an object of the present invention to present a method of making sugar products of a structure which is the same as, or is similar to, that of known hard foamed sugar products but do not thereby have to be exposed to heating and will therefore escape the above-described drawbacks of hard foamed sugar products.

It has been found that the reason for the contrasted stability of hard and soft foamed sugar products lies in the fact that there are in the soft foamed sugar products fat-cleavage enzymes (proteoses, lipases, carbohydrates) which split the albumen and fatty components and this contributes to the aforementioned undesirable modification of the products. These enzymes are apparently destroyed during the heating which produces the hard foamed sugar products and this explains the increased keeping life of the hard products.

It has now been found possible to make stable foamed sugar products with a hard structure even without heating if the albumen-containing foam is treated with alcohol and subjected to a clean drying process. It is thought probable that in carrying out this treatment the albumen - and fat-cleaving enzymes, responsible for the undesirable variation in the eventual product, are rendered harmless.

The present invention, therefore, provides a method of preparing albumen-containing foam for sweetmeat products in which an albumen-containing mass is foamed and its water content reduced, and this method is characterised by the fact that the mass or foam is treated with alcohol.

The albumin-containing starting material for the method of this invention may for example comprise hen's egg albumen, protein-enriched skimmed milk or cream, with at least a 38 percent fat content. The starting material may be sterilized by heating. The mass may be foamed in standard fashion, for example in a rapidly rotating stirring mechanism or by the blowing in of nitrous oxide. Before this mechanical treatment the mass may be mixed with fruit-pulp. Care must in this event be taken that the moisture is not rendered too acid by the mixing with the pulp. The pH-value should not exceed 6.8–8 because otherwise there will be danger of coagulation of the mass.

The alcohol treatment can take place in various ways. Thus, for example it is possible to add the alcohol to the albumen-containing mass before the foaming actually takes place. In this performance of the method the reduction in water content can advantageously be achieved by subjecting the foamed albumen-containing mass to a spray-drying treatment. Instead of spray-drying the foamed mass could be centrifuged on a rotating plate.

The foam powder produced by the spray process can be consolidated in an extrusion press and then divided into small pieces which can be coated with chocolate. Alternatively it can be packed into hollow praline shells after appropriate consolidation.

The small particles produced by spraying from a nozzle are themselves hollow and this prevents the foamed and airy structure being lost during the aforesaid consolidation process.

In another operating method the albumen-containing mass is first beaten and the alcohol is poured over the albumen foam after the water content has been reduced. Preferably the water content is preliminarily reduced to a maximum of 20 percent. The alcohol is then vaporized or allowed to vaporize. This vaporization of the alcohol will still further reduce the residual water content in the foam.

In this procedure it is preferred to spread the finished foam on metal plates, freeze it, and finally vacuum-dry it. The vacuum is preferably set at about 0.1 Torr, and the plates used are advantageously warmed underneath. For example in the case of foamed albumen-enriched skimmed milk the heating takes place up to a maximum temperature of 30°C. During the ensuing vaporization of the water the vacuum can be gradually set to 1/1,000 Torr.

When the method has been persisted in to such an extent that the mass has a relatively rigid structure, normal pressure is then restored and alcohol poured over the foamed mass.

The alcohol can be left for ½ hour to 1 hour to act on the foamed but relatively rigid mass to which it has been applied. The vacuum chamber is then closed again and a vacuum applied to distil off the alcohol. Advantageously the aforesaid plates are cooled from below during this phase and the degree of vacuum simultaneously increased. The process is continued until the moisture has completely disappeared. The chambers can then be restored to normal pressure and the product removed.

Instead of pouring alcohol over the material it can be injected thereover in the vacuum chamber. This will reduce the waste in alcohol. The alcohol distilled off can be used afresh. Account will however have to be taken of the fact that repeated use of the alcohol will increase its water content so that it will have to be concentrated by re-distillation from time to time.

The product is of a firm quality similar to that of the conventional hard foamed sugar products and can be cut into strips or pieces and coated with chocolate.

The following are given as examples of the practice of the method of this invention.

EXAMPLE 1

1 kg of D-albumen (skimmed milk powder enriched with albumen powder up to 60 percent of the total dry mass) is dissolved in 2.5 kg water at 40°C, mixed with 1 kg sugar (cane sugar saccharose, fructose, glucose etc.) and 250 g fruit pulp, and is then foamed by a known method after homogenization. Care must be taken that the pH-value does not sink below 7 after the mixing in the fruit pulp. If necessary it can be neutralized by known neutralizing agents.

The foamed mass is placed on sheet metal and frozen in a freeze-drying appliance. The frozen mass is then introduced into a standard commercial vacuum dryer in which water is extracted from the mass under vacuum in the usual manner. The total dwell period in the vacuum is 8 hours, a low degree of vacuum being applied at the start of the treatment but increased as more water is removed. After about 6 hours the mass is treated with alcohol (ethanol 95 percent) and this allowed to act on the mass for ½ hour. The quantity of alcohol used is about twice the amount of residual water in the mass. The drying procedure is then performed in vacuum for about 2 hours.

The resultant mass may be made into cubes, bars, or other shapes and for example coated with chocolate; it is stable and with a 98% drying retains this condition for at least 3 months.

EXAMPLE 2

10 kg sterilized cream (38 percent fat) are mixed by continuously stirring with 500 g cherry pulp and 500 g sugar and, after homogenization, foamed by a known procedure.

The method of example 1 is then followed.

EXAMPLE 3

10 kg sterilized cream (38 percent fat) are mixed by continuously stirring with 500 g cherry pulp, 500 g sugar, and 50 ccm of ethanol (95%) and foamed by a known procedure. Subsequent to this the method set out in example 1 is followed.

EXAMPLE 4

10 kg of sterilized cream (38 percent fat) is prepared as in example 3 and foamed. The foamed mass is then atomized in a pressure or compressed air atomizer and dried.

I claim:

1. In a method of preparing albumen-containing foam for sweet-meat products in which an albumen-containing mass is foamed and its water content reduced, the improvement whereby the mass is treated with alcohol before the foaming operation.

2. A method according to claim 1, in which the foamed and alcohol-treated albumen-containing mass is subjected to spray drying.

3. A method according to claim 1, in which the water content of said mass is reduced by vacuum drying and alcohol is injected into the mass during said vacuum drying.

* * * * *